Nov. 3, 1959   L. BODDY   2,911,633
ELECTRICAL CONTROL SYSTEM
Filed Sept. 23, 1955   2 Sheets-Sheet 1
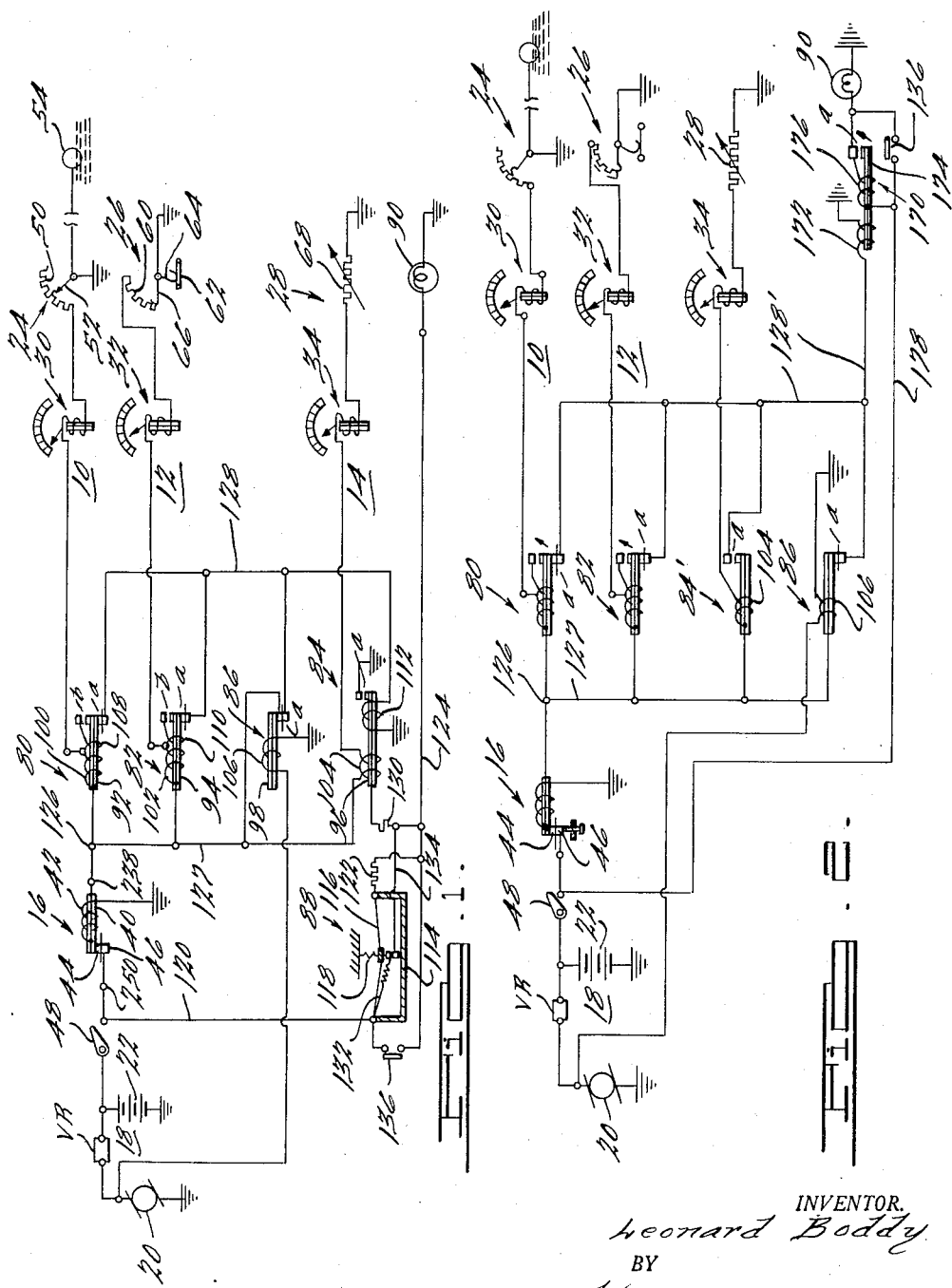
INVENTOR.
Leonard Boddy
BY
Harness, Dickey & Pierce
ATTORNEYS

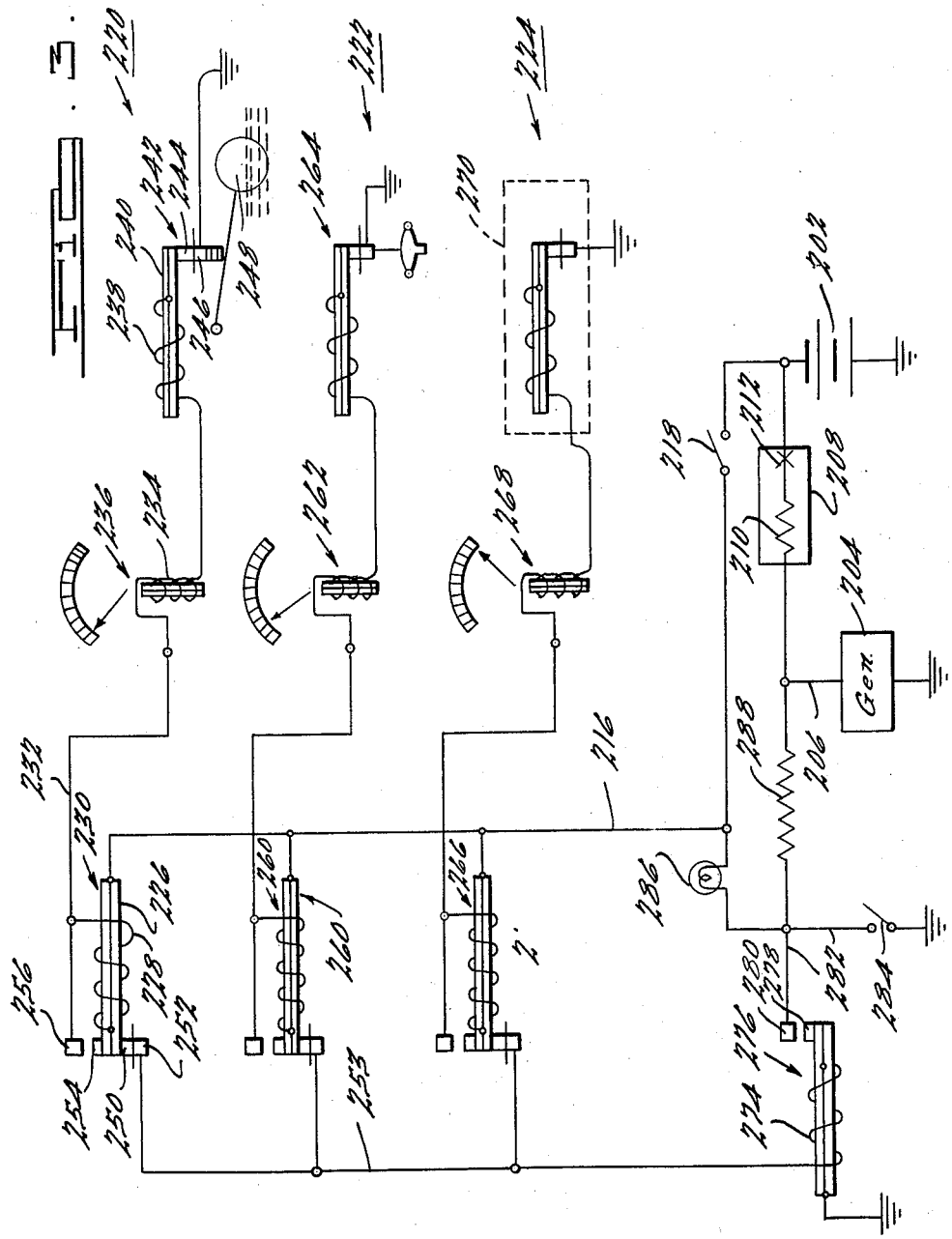

United States Patent Office 2,911,633
Patented Nov. 3, 1959

2,911,633

ELECTRICAL CONTROL SYSTEM

Leonard Boddy, Ann Arbor, Mich., assignor to King-Seeley Corporation, Ann Arbor, Mich., a corporation of Michigan Application September 23, 1955, Serial No. 536,226

39 Claims. (Cl. 340—213)

This application is a continuation-in-part of my application Serial No. 138,249, filed January 12, 1950, now Patent 2,762,997, granted September 11, 1956, and the disclosure of that application and patent, and of the applications and patent referenced therein, are intended to be a part of the present application as fully as if they had been reproduced varbatim herein.

Both the present invention and the invention claimed in the above-identified parent application relate to signaling and control systems such as may be employed, as an example, in combination with automotive gauging systems.

In general, in the illustrated embodiments in both the present and the parent applications, the combined gauging and signaling systems include a plurality of indicators for indicating a plurality of operating conditions of a vehicle (such as fuel level, oil pressure, engine temperature, and the like) and also includes signaling means operative in the event any one or more of the aforesaid or other operating conditions reaches a critical value.

The subject matter of the above-referenced parent application includes an improved signaling relay structure having the capability of effectively varying its own impedance in a selected manner, and also includes systems comprising a combination of elements some of which possess such an impedance-varying capability.

The present invention relates to signaling and control arrangements and sub-combinations, some of which are also disclosed in the referenced parent application and others of which are closely related thereto in principle, but are newly presented herein.

In accordance with certain of the principles of the invention, improved means are provided for sensing the condition of an electrical circuit (which may but need not be a gauging circuit) and for signaling the existence or attainment of a preselected condition in said circuit, such as, for example, the increase or reduction of the average current in that circuit, or a portion thereof, to a preselected value, herein termed a critical value, evidencing the existence or attainment of a preselected condition, herein termed a critical condition, as sensed by some device or apparatus controlling the magnitude of that current. The output signal may be employed to actuate an alarm device or a control device, and it is intended that the term signaling shall be generic to both alarming, controlling and signaling (in its limited sense).

In this aspect, the invention also relates to the establishment of a cooperative relationship between two or more signaling devices and between a signaling device and a time-delay or integrating device, as well as between other sub-combinations of such elements.

In another of its aspects, the invention relates to relay devices capable of fulfilling plural functions. Thus, a single relay embodying certain of the principles of the present invention may be employed both as a condition-sensing or signaling relay and as a time-delay or integrating relay responsive to other condition-sensing or signaling relays. Similarly, a single relay may be employed to sense the existence of a critical condition, or to respond to a separate condition-sensing device, to produce an alarm indication, and to modulate, vary or periodically interrupt that output indication.

In another aspect, the invention relates to a plurality of discrete means for operating an alarm device, some of which do or may and some of which do not include a signaling relay as a constituent element. Additionally, an improved arrangement is disclosed adapted to sense and signal, with a minimum of elements, a selected critical condition, such as an improper generator output voltage.

The principles of the invention, or some of them, may be applied to gauging systems of the type disclosed in the referenced patent application, as well as to gauging systems of the type disclosed in my Patent 2,625,595.

The nature of the invention, other applications of the principles of the invention, and objects and features thereof, will be appreciated from the following detailed description of exemplary embodiments thereof when read with reference to the accompanying drawings in which:

Figure 1 is a diagrammatic view of a gauging and signaling system embodying certain of the principles of the invention;

Fig. 2 is a diagrammatic view of a gauging and signaling system modified from that of Fig. 1, and embodying certain other principles of the invention; and Fig. 3 is a diagrammatic view of another form of a gauging and signaling system, embodying certain other principles of the invention.

Considering first the system of Figure 1, the illustrative gauging circuits 10, 12 and 14, are connected in parallel with each other and receive electric energy, at a voltage regulated by regulator 16, from a source 18. The source 18 may be of various types, but when, as aforesaid, the present improvements are used in connection with automotive vehicles, source 18 may, for example, comprise a usual engine driven generator 20 and a battery 22. In line with conventional automotive practice, a voltage regulator VR is interposed between the generator and the battery and, as will be understood, serves to maintain the voltage of the latter between limits which are acceptable for many of the vehicle requirements. In practice, these limits are not close enough for satisfactory operation of desirably simple electric gauges.

The regulator 16 receives the noticeably variable output of the source 18 and delivers pulsating energy to the gauging circuits, the effective voltage of the regulator being substantially independent of variations in the voltage of the source. Under these conditions, it will be appreciated that the individual gauging circuits can utilize simple rheostatic type units 24, 26 and 28 which, in response to liquid level, oil pressure and engine temperature serve to vary the resistance of the individual gauge circuits and thereby control the current therethrough, and consequently the positions of, the individual indicators 30, 32 and 34.

As diagrammatically shown in Figure 1, the regulator 16 may comprise a thermally responsive trimetallic element 40, which carries a heater winding 42. The trimetallic form is preferred since it makes it readily possible to provide good warpage characteristics, and still have, as an intermediate layer, a member which is a good conductor.

One terminal of winding 42 is grounded as indicated and the other terminal thereof is electrically connected to the element 40. Element 40 carries a movable contact 44, which normally engages an adjustably fixed contact 46. Contact 46 is turn is connected to the source 18 through a control switch 48 which may, for example, be controlled concurrently with or be a part of the ignition switch of the associated vehicle.

With this relation, it will be appreciated that closure of switch 48 completes the circuit from the source 18, through contacts 46—44, the body of the element 40 and the heater winding 42 to ground. Completion of this circuit supplies heat to the element 40 and causes its temperature to rise. The electrical resistance of the element 40 is so low that for all practical purposes, all of the heating effect can be considered as being derived from the winding 42. With this relation, element 40 can also serve as a conductor of the gauging currents.

Upon being heated, the element 40 warps and separates the contacts 44 and 46, interrupting the just traced circuit and interrupting the heating effect. The reduction in heating effect enables the element 40 to cool and restore the contacts 44—46 to closed condition. So long, accordingly, as switch 48 remains closed, contacts 44—46 are periodically opened and closed and the heating current is correspondingly modulated. Consequently, the element 40 acquires a temperature just high enough to hold the contacts 44—46 in a condition of incipient closing and opening. This critical temperature can be variously determined, as an incident to manufacture, by adjusting the position of the fixed contact 46 relative to the contact 44, so as to correspondingly determine the initial pressure between these terminals. For automotive work, it is usually preferred to adjust the regulator 16 to provide a regulated or effective voltage of about 5 volts or 5.4 volts, depending upon the absence or presence of the hereinafter described signal mechanism. Consequently, as aforesaid, and neglecting ambient effects, regulator 16 acts to receive from the source 18 an amount of electric energy, in pulsating form, which has a substantially uniform heating value. On this basis, and since, over any period of time, the wattage input to the regulator heater ($E^2/r$) is at a substantially constant rate, it is evident that the regulator 16 breaks up the energy supplied by source 18 into a succession of pulses having an effective voltage which is independent of variations in the voltage of the source 18.

As is disclosed in detail in the aforesaid parent application and applications therein referred, such as application Serial No. 108,773, filed August 8, 1949, regulator 16 may be caused to maintain its regulated voltage at a substantially uniform value. In the use of the illustrated thermally responsive indicators 30, 32 and 34, however, improved compensation for the effect of changes in ambient temperature upon the rates at which heat is radiated from these indicators can be achieved by causing the output voltage of the regulator 16 to vary slightly as a function of ambient temperature. For the purpose of the present invention, it is sufficient to note that the output voltage of the regulator 16 can either be regarded as uniform or as varying slightly as a function of ambient temperature.

The voltage impressed across winding 42, beween contact 44 and ground is, of course, equal to the voltage impressed upon the individual gauging circuits 10, 12 and 14. These circuits, therefore, are supplied from the source 18 with pulsating energy at the effective voltage of the regulator 16. Regulator 16 thus effectively serves as a regulator of the voltage impressed across the gauging circuits, and currents drawn by the individual gauging circuits are thus independent of variations in voltage of the source 18.

In the broader aspects of the invention, any of a variety of well-known electroresponsive constructions can be employed in connection with the individual indicators 30, 32 and 34, the diagrammatically shown movable elements whereof may consequently function to commutate circuits, provide visual indications or otherwise. Preferably these indicators are of the well-known temperature compensated, thermostatic type. Each indicator employs a bimetallic element which carries a heater winding. Warping of the bimetallic element actuates an indicator needle in any well-known manner. It will be appreciated that the use of thermostatic indicators is advantageous in that they inherently have some heat capacity which can be matched with the performance of the regulator so that the individual pulsations introduced by the latter into the current supply are integrated by the gauges. In typical cases, the pulsating rate may be between 60 and 90 pulsations per minute. The matched thermal capacities provide a synchronism of displacement of the indicator bimetal with that of the regulator following initial closure of the switch 48 and thereby provides for an accelerated pointer travel to the final point of indication, before the regulator starts its pulsating regulation of voltage. This action is desirable for quicker readings and arises from the fact that during the initial period of lag, the gauging circuits and winding of the regulator are subject to the full unregulated voltage of the source 18.

The liquid level unit 24 in Figure 1 is diagrammatically shown as comprising a resistor 50 disposed to be variably engaged by a grounded contact 52 which in turn is suitably connected to a float 54. As the liquid level rises, the amount of resistor 50 included in gauging circuit 10 is correspondingly reduced, which action, of course, increases the current drawn by the corresponding indicator 30. This current increase raises the temperature of its associated bimetal and causes a corresponding travel of the indicator needle. A reverse action is, of course, caused by the lowering of the liquid level.

In the fluid pressure responsive gauging circuit 12, the indicator 32 is connected to ground through a resistor 60, the value of which is governed by fluid pressures acting against a diaphragm 62. These pressures act through a lever 64 to adjust a contact 66 along resistor 60.

In the temperature measuring circuit 14, indicator 34 is connected to ground through a resistor 68 such as a thermistor, having a negative temperature coefficient of resistance. Resistor 68, of course, is located in a region the temperature of which is to be measured and changes in temperature correspondingly affect the position of the needle of the corresponding indicator 34.

As thus far described, it will be recognized that so long as ignition switch 48 is closed, regulator 16 acts to impress across the individual gauging circuits pulsating electrical energy, the effective or root-mean-square voltage whereof is substantially independent of variations in the voltage of the source 18, as well as being substantially independent of the gauging currents which are drawn by the individual gauging circuits 10, 12, and 14. It will also be appreciated that the individual indicators 30, 32, and 34 individually respond to variations in the values of their corresponding rheostatic units 24, 26, and 28, and produce corresponding indications of the associated operating conditions—fuel level, oil pressure, and engine temperature.

In accordance with the present invention, the gauging circuits 10, 12 and 14 are provided, respectively, with signal relays 80, 82, and 84. An additional signal relay 86 is provided to respond to the condition of the generator 20. All of the relays 80, 82, 84, and 86 are arranged to control a flasher 88, which in turn, controls a signal light 90. The signal light 90 is common to all of the signal relays, and so does not indicate which of the signal circuits has reached a critical condition. It does, however, indicate that at least one thereof has reached a critical condition, and by attracting the attention of the operator, leads him to inspect the individual indicators 30, 32, and 34, and the usual ammeter or voltmeter (not shown) associated with the generator, to determine what operating condition it is that requires attention.

Each of the signal relays 80, 82, 84, and 86 is illustrated as being of the thermally responsive type, and comprises bimetallic elements 92, 94, 96 and 98, which carry corresponding heater windings 100, 102, 104, and 106. In this embodiment, windings of relays 80, 82, and 84 are directly connected in series with the corresponding indicators and rheostats, and the winding of relay 86 is connected across the generator 20. Relays 80 and 82 are provided with normally closed contacts *a* and normally open contacts *b*. Relay 84 is provided with normally open contacts *a* and relay 86 is provided with normally closed contacts *a*. Relays 80 and 82 also carry additional windings 108 and 110, the purpose of which is described below.

Relay 84, in addition to responding to conditions in the temperature measuring circuit 14, also acts to interpose a delay between the operation of any of relays 80, 82, and 86, and the consequent operation of the flasher 88. For this purpose, relay 84 is provided with a second winding 112.

The flasher 88 may, of course, be of any desired type. As illustrated, it is of the hot wire type, and comprises a frame 114, between the upstanding legs of which a wire 116 is stretched. Wire 116 has a pronounced positive coefficient of expansion and normally the tension thereof is such as to maintain its associated contacts *a* in separated condition, in opposition to the continuously acting force of the compression spring 118. Full current flow through the wire 116 heats and elongates it, enabling spring 118 to close contacts *a*. Closure of these contacts short-circuits wire 116, allowing the latter to cool and reopen the contacts.

Flasher 88 is subject to control by normally open contacts *a* of relay 84. So long as these contacts are open, wire 116 is supplied with current of a low value from the source through switch 48, conductor 120, wire 116, current limiting resistor 122, conductor 124, and lamp 90 to ground. The value of this current is too low to permit closure fo contacts *a* of flasher 88, but it does serve to dimly light lamp 90 and thereby afford a continuous but unobtrusive indication of the condition of the latter.

Coming now to the operation of the signal mechanism, the parts normally occupy the illustrated positions. Closure of switch 48 enables regulator 16 to impress the aforesaid regulated voltage across the gauging circuits. Consequently, indicators 30, 32, and 34 start rising to positions corresponding to the existing values of their associated rheostats 24, 26, and 28. The voltage initially impressed across the circuit by regulator 16 is the existing fluctuating voltage of the source 18. This initially higher voltage serves to rather promptly heat up the regulator 16 and place it in operation. In view of the thermal capacities thereof, the warm-up periods of the indicators 30, 32 and 34 substantially match those of the regulator 16.

At the time of initial closure of switch 48, contacts *a* of relays 80 and 82 are closed, and these contacts remain closed for a short time thereafter, due to the thermal capacities of these two relays. While closed, relays 80 and 82 each complete a circuit (through wire 128) for winding 112 of relay 84 which thereupon starts to heat bimetallic element 96. The thermal capacities and rates of heat application to relays 80 and 82 and bimetal 96, however, under these conditions, are such that unless either of circuit 10 or 12 is in a critical condition, contacts *a* of relays 80 and 82 open before contact *a* of relay 84 closes.

Relay 86 can be set for any prescribed voltage, but is preferably set so as to open its contact *a* at the voltage normally attained by generator 20 at an engine speed just above idling speed. The thermal delay in relay 86 is also less than that introduced into relay 84. Accordingly, assuming that the generator is in satisfactory condition at the time switch 48 is closed, and that no critical conditions exist in either of circuits 10 and 12, all of relays 80, 82 and 86 will have opened their normally closed contacts *a* before the heat from winding 112 is able to cause contact *a* of relay 84 to close. It may be assumed, of course, that the engine temperature is low, in which event winding 104 of relay 84 carries little current and does not heat relay 84 sufficiently to close contacts *a* thereof.

The rate at which heat is applied by winding 104 is preferably low in relation to the rate at which heat is supplied by winding 112. Consequently, the thermal lag of relay 84 exceeds the thermal lags of relays 80, 82 and 86, even though switch 48 is initially closed at a time when the engine temperature is relatively near the critical value. Under normal conditions, therefore, closure of switch 48 serves only to cause the indicators 30, 32 and 34 to take up appropriate positions and to cause lamp 90 to dimly glow, indicating that it is in operative condition.

In addition to preventing the giving of transient signals immediately following closure of ignition switch 48, the thermal delay interposed by relay 84, also prevents such transient signals from occurring during operation. For example, if the vehicle engine speed remains at an idling value for an appreciable length of time, contact *a* of relay 86 may close. Such closures of short duration, however, such as might be occasioned by a stoppage of the vehicle by a traffic light, are not long enough to cause closure of contact *a* of relay 84. Similarly, momentary closures of contacts *a* of relays 80 and 82 are not effective to give signals.

It will be appreciated, of course, that the delay interposed by relay 84 may be varied between relatively wide limits. For example, to handle normal traffic stoppages, a delay of between 20 and 50 seconds may be desirable, which interval is also ample to take care of the warm-up periods following initial closure of switch 48, as discussed above. It will also be appreciated that by a proper correlation of the rates at which heat is supplied to and can be radiated from the relay 84, as well as of the amount of travel required of the bimetal 96 in closing contacts *a*, the delay in closing of relay 84 may be made very substantially longer than the delay involved in its reopening. Thus, elimination of the critical operating condition can be caused to quite promptly extinguish the warning signal.

Assuming now that the level of the fuel in the tank becomes dangerously low, it will be appreciated that the current in gauging circuit 10 falls to a correspondingly low value and the temperature of relay 80 drops to a value at which contacts *a* thereof close.

Such closure completes an obvious circuit from terminal 126 through bimetallic element 92, contacts *a* of relay 80, and conductor 128, for the winding 112 of relay 84. Completion of this circuit supplies heat to bimetallic element 96 and after a brief delay, causes contacts *a* of relay 84 to close. Closure of these contacts completes a circuit for wire 116 of flasher 88 which includes resistor 122 and, in parallel with the resistance of lamp 90, resistor 130. The thus increased current flowing in wire 116 promptly heats it, enabling spring 118 to close contacts *a* of flasher 88. Closure of these contacts not only short-circuits wire 116, but also connects lamp 90 directly to conductor 120 through conductors 132 and 134. Lamp 90 thus glows at full intensity. The short-circuiting of wire 116 causes it to cool and reopen contacts *a*. The latter action re-initiates the heating of wire 116 and also dims lamp 90. So long, accordingly, as contacts *a* of relay 84 are closed, flasher 88 operates to periodically open and close its contacts *a* and thereby cause lamp 90 to flash.

It is believed to be obvious that a dangerously low oil pressure similarly causes contacts *a* of relay 82 to close and cause a flashing of lamp 90 in the manner above described. Similar comments apply to a generator failure, by virtue of the consequent closure of contacts *a* of relay 86.

It will be noticed that the attainment of a dangerous engine temperature is accompanied by an increase in current in the corresponding gauging circuit 14. This fact makes it possible to give relay 84 its combined function of responding to temperature conditions, and of interposing delays in the flashing action of lamp 90, following operation of any of relays 80, 82 and 86. More particularly, it will be noted that if the temperature reaches a dangerous value, the current in winding 104 rises to a high enough value to independently cause closure of contacts *a* of relay 84 and thereby produce the flashing action of lamp 90 in the previously described manner.

It will be appreciated that lamp 90 may be caused to respond to operating conditions other than those discussed above, either through the flasher 88, or independently thereof. As an example of a control for lamp 90 which is independent of flasher 88, lamp 90 is illustrated as being directly subject to a normally open switch 136, which may, for example, be controlled by the usual hand brake. This switch is open when the hand brake is released, and is closed when the hand brake is applied. Lamp 90 burns continuously and brightly so long as the hand brake is applied, and switch 48 is closed.

Coming now to the remaining details of construction of the signal mechanism, and with reference first to relay 80, it will be noticed that the winding 100 thereof absorbs a portion of the output voltage of regulator 16. If this relay is so designed in relation to the balance of circuit 10 that the voltage drop appearing across the winding 100 is always a negligibly small percentage of the voltage regulator 16, it will be appreciated that relay 80 can be added to or cut out of the corresponding gauging circuit, without appreciably changing the current flowing therein.

In accordance with present practice, however, in order to insure reliable operation of relay 80, it is preferred to so design it that it consumes an appreciable percentage of the power consumed in the corresponding gauging circuit. This is partcularly important in view of the fact that relay 80 is designed to operate at minimum values of current in the corresponding gauge circuit. In a typical case, it is preferred that winding 100 have a resistance of approximately 8 ohms. At the critically low fuel level values, the setting of rheostat 24 may be such as to interpose approximately 70 ohms in the corresponding circuit 10. Finally, under these conditions, the resistance of indicator 30 may amount to approximately 12 ohms. In such case, gauging circuit 10 may have a total resistance of approximately 90 ohms, of which 8 ohms appear in winding 100.

On the other hand, when the fuel tank is full, the effective resistance of rheostat 24 may be of the order of 10 ohms. At this higher current, the resistance of indicator 30 may be 15 ohms. In this instance, as thus far described, the overall resistance of gauging circuit 10 amounts to 33 ohms. The 8 ohm winding 100 thus represents a very considerably higher percentage of the overall resistance of the circuit at high fuel levels than at low fuel levels.

It will be appreciated that if indicator 30, rheostat 24, and signal relay 80 are designed to be always used together, rheostat 24 can be so designed, and indicator 30 can be so calibrated, as to eliminate the effect of the change in the percentage of the source voltage which would be absorbed by winding 100. In such a case, however, elimination of the signal relay 80 would throw the gauging circuit out of adjustment. The voltage of regulator 16 could, of course, be adjusted to bring the system back to balance at some selected point on the scale, but the system would still be out of balance at all other points along the scale.

With the foregoing considerations in view, a further feature of the signal mechanism which may but need not be employed in the system and sub-combinations claimed herein, resides in so arranging the relay 80 that the effective impedance (specifically the resistance, in the illustrated direct current systems) thereof progressively decreases as the corresponding gauging currents increase. This progressive decrease in resistance serves to enable the signal mechanism to be added to a gauging system comprising only the indicators and the rheostats, as an accessory, by the simple expedient of increasing the output voltage of regulator 16, without noticeably disturbing the calibration of the system at any point along the entire scale from minimum to maximum current.

Broadly speaking, and depending upon the requirements of the particular system, the points along the scale at which full compensation is desired, and the permissible range of departure from full compensation, the maximum and minimum values of resistance of relay 80 may be widely varied. In the present examples, a range from a maximum of 8 ohms to a minimum of 2 ohms is assumed for purposes of detailed explanation. Such explanation will serve to illustrate the applicability of other ranges under appropriate conditions.

More particularly, relay 80 is provided with the aforesaid normally open contacts *b*, and the aforesaid secondary winding 108. So long as contacts *b* are open, winding 108 is disconnected. So long, however, as contacts *b* are closed, winding 108 is connected in parallel with its associated winding 100. With the two windings thereof connected in parallel, the resistance of relay 80 is, of course, materially diminished.

In the foresaid typical case, at zero scale reading indicator 30 may have a resistance of approximately 12 ohms and rheostat 24 may have a corresponding resistance value of approximately 70 ohms. Neglecting, or in the absence of, relay 80, regulator 16 may be set to produce a voltage of approximately 5 volts, giving a zero scale current of approximately 60 milliamperes. At full scale reading, on the other hand, rheostat 24 may have a resistance of 10 ohms, and indicator 30 have a resistance of 15 ohms, in which event the 5 applied volts produce a gauging current of approximately 200 milliamperes.

Assuming that winding 100 of relay 80 has, as aforesaid, a resistance of 8 ohms, and that substantially full compensation for the addition of relay 80 is desired at the zero scale position, it will be appreciated that the voltage of regulator 16 should be increased to approximately 5.4 volts, which will cause a current of approximately 60 milliamperes to flow through the approximately 90 ohms of resistance now represented by winding 100, indicator 30, and rheostat 24.

Assuming now that the fuel level gradually rises, the temperature of relay 80 will also gradually rise. It is usually preferred to have contacts *a* open at a fuel level approximately 5% of full value. The opening of contacts *a* of relay 80 is, of course, without effect except to interrupt the flashing of lamp 90, in the previously described manner. This 5% point may correspond, for example, to approximately 65 milliamperes in the gauging circuit.

In order to insure against transient operations of the relay contacts, it is preferred to so space the fixed contact elements *a* and *b*, that the normally open contacts *b* do not initially close until the gauging current rises to, for example, 85 milliamperes. As soon as these contacts *b* close, they connect windings 100 and 108 in parallel with each other. In the typical case now being described it is also desired that full compensation be provided at the full scale 200 milliampere point. Thus winding 108 may have a resistance of approximately 2.66 ohms, in which event the network resistance of windings 100 and 108 is equal to 2 ohms.

The drop in resistance of relay 80 from 8 to 2 ohms (caused by closure of contacts *b* of relay 80) slightly increases the current in the gauging circuit 10. However, at the 85 milliampere current value, the resistance of elements 30 and 24 still amounts to in excess of 60 ohms. The increase in current drawn by relay 80 is thus considerably more than offset by the drop in resistance of relay 80 and the wattage consumed by relay 80 falls to too low a value to maintain contacts *b* closed. These contacts, therefore, rather promptly reopen, re-establishing the 8 ohm value for relay 80 and causing the contacts *b* to again close. Since 85 milliamperes through 8 ohms is just sufficient to cause contacts $b$ to close, it will be appreciated that at the 85 milliamperes point, contacts $b$ are open almost all the time and are closed only a very minor percentage of the time. At this critical operating point, accordingly, which may correspond to about the 10% point on the indicator scale, the effective resistance of relay 80 may still be regarded as being 8 ohms. Thus, from the 60 milliampere point to the 85 milliampere point the resistance of relay 80 remains unchanged and a slight and progressively increasing unbalance in the calibration of the indicator 30 occurs throughout the range from 60 to 85 milliamperes. This unbalance is, however, negligibly small. For example, in the absence of relay 80, and with the voltage regulator 16 set at 5 volts, the 85 milliampere value obtains. With the addition of 8 ohms (relay 80) and an increase in the voltage of regulator 16 from 5 to 5.4 volts, a gauging current of between 82 and 83 milliamperes is obtained. This error is well within commercial tolerances, and is on the safe side. The net change in the scale reading of indicator 30 does not exceed 2%.

As the liquid level rises in the tank, the resistance of rheostat 24 progressively decreases, and the value of the gauging current, of course, increases. As the gauging current increases, contacts $b$ of relay 80 remain closed throughout progressively longer intervals of time. This is, of course, because relay 80 cannot absorb more than a fixed number of watts (for example, approximately six-hundredths of a watt in the example now being given) unless and until such a time as the gauging current rises to a value at which contacts $b$ remain continuously closed. In the present example, this critical condition is not reached until approximately the 170 milliampere point on the scale.

In the example now being given, and at approximately the 130 milliampere point, the effective resistance of relay 80 assumes a value which is just compensated for by the change in voltage of regulator 16 from 5 to 5.4. To make the point clear, in the absence of relay 80, and at 5 volts, the gauging current attains a value of approximately 130 milliamperes at a time when rheostat 24 represents about 25 ohms and the resistance of indicator 30 is at about 13.25 ohms. At 130 milliamperes, the effective resistance of relay 80 is approximately 3.50 ohms. It will be obvious that 5 volts produces the same gauging current through 38.25 ohms of resistance as is produced by 5.4 volts through 41.75 ohms of resistance. Throughout the range, therefore, from 85 milliamperes of gauging current to 130 milliamperes of gauging current, the slight error present at the 85 milliampere point gradually diminishes and disappears at approximately the 130 milliampere point.

As aforesaid, at and above approximately 170 milliamperes of gauging current, contacts $b$ of relay 80 remain continuously closed, since the wattage consumed at 170 milliamperes and 2 ohms is sufficient to hold the contacts closed. From this scale point on, the resistance of relay 80 remains fixed at its minimum value of 2 ohms. At the 170 milliampere point on the scale, and with the indicated design factors, a slight error (of the order of one milliampere) in the reading of gauge 30 is produced, which slight error gradually disappears as the gauging current falls towards the aforesaid 130 milliampere reading.

At full scale reading, corresponding to approximately 200 milliamperes, the system is again in balance. Under these conditons, as aforesaid, indicator 30 represents about 15 ohms and rheostat 24 represents about 10 ohms, enabling 5 applied volts to produce the 200 milliampere gauging current. Under these same conditions, two additional ohms in relay 80 are just compensated for by the increase in voltage of regulator 16 from 5 to 5.4 volts. The slight error thus present at the 170 milliampere reading thus gradually decreases as the gauge readings increase, and ultimately disappears at full scale reading.

The foregoing remarks have assumed that the established voltage of regulator 16 (5 or 5.4 volts) remains uniform throughout the full range from minimum to maximum gauging currents. As aforesaid, in the interest of more fully eliminating the changes in the rates at which heat is radiated from the indicators, resulting from changes in ambient temperature, it is preferred to so design the regulator 16 as to cause it to have a voltage characteristic which rises slightly with increases in ambient temperature. Such a rising characteristic adds proportionately to the initial five volts, or 5.4 volts, as the case may be, and normally does not exceed one-tenth of a volt. Such a rising characteristic makes no substantial change in the direction and degree to which the addition of the signal relays alters the calibration of the system.

In the examples thus far given, a desirable degree of compensation throughout the full range from zero to full scale reading of the indicator is accomplished by selecting a minimum resistance value for the signal relay which is attained at an intermediate scale point, and which remains fixed from that point throughout the remainder of the scale. It will, of course, be appreciated that in certain instances design factors may make it desirable to advance or delay the scale point at which the minimum resistance value is attained. If the minimum resistance value is increased, the effect is, of course, to cause the signal relay to attain its minimum value of resistance at a lower point along the scale. Decreases in the minimum resistance have the opposite effect, and cause the minimum value of resistance to be attained at a higher point along the scale. In certain instances, also, the design factors may be such that the most desirable compensation is achieved by selecting a resistance value for winding 108 which is so low that the signal relay continues to pulsate (i.e., open and close its contacts $b$) throughout the full range of movement of the indicator, and thus never attains a stable minimum value. In such cases the effective resistance of the signal relay continuously decreases from the scale point at which contacts $b$ of relay 80 initially close throughout the balance of the movement of the indicator 30. Such cases are exemplary of those in which the resistance of the secondary winding 108 of the signal relay resistance approaches or reaches zero. In the latter instance contacts $b$, when closed, directly short-circuit the main winding 100.

In practice, accordingly, maximum and minimum resistance values for relay 80 are chosen which enable it to absorb a desirably large amount of power, and which, while giving full compensation at desired points along the scale, maintain the range of departure from full compensation, at intermediate scale readings, within commercially acceptable limits.

As aforesaid, relay 82 may be and preferably is a structural duplicate of relay 80. Consequently, the discussion of the functioning of relay 80 and circuit 10 will serve as a description of the action of relay 82 ad circuit 12. No question of voltage balancing is involved in connection with the relay 86. Consequently, only a single winding is provided on this relay.

If desired, winding 104 of relay 84 may be provided with a companion winding for connection in parallel therewith, as described in connection with relay 80. Since, however, accurate readings of the temperature indicator are important only at the higher scale positions, it is preferred to provide relay 84 with only a single winding 104, having a resistance of approximately 2 ohms. As described in connection with relay 80, 2 ohms at the 170 milliampere scale point, brings the system very nearly into balance, and brings the system exactly into balance at the 200 milliampere point. Throughout a range starting well below the danger zone on the temperature indicator, accordingly, circuit 14 is in balance or very nearly so. Thus, in practice, the single 2 ohm winding on relay 84 fully meets commercial needs.

The system of Figure 2 is, in a generic sense, functionally equivalent to the system of Figure 1, but employs a flasher unit 170 which is itself capable of providing the time delay feature which, in the system of Figure 1, is provided by relay 84. Accordingly, in Figure 2, the signal controlling contacts a of relays 80, 82, and 86, are directly connected to line 128' which supplies winding 172 of flasher 170. Relay 84', which replaces the previously described relay 84, is provided with only a single winding 104 which is associated with the temperature measuring circuit 14 in the previously described manner. In this instance, contacts a of relay 84' supply winding 172 through conductor 128'.

Flasher 170 comprises a bimetallic body 174, which carries the previously described winding 172 and a companion winding 176. Neither winding 172 nor 176, acting alone, is effective to close contacts a of flasher 170. If both windings are energized at the same time, however, sufficient heat is supplied to body 174 to close contacts a.

The parts are shown with their contacts in the positions normally occupied thereby, contacts a of relays 80, 82, and 86 being closed, and contacts a of relay 84', being open. Closure of switch 48 thus immediately completes the circuit for both of windings 172 and 176. The former circuit includes the parallel connected contacts a of relays 80, 82, and 86, and conductor 128'. The circuit for winding 176 extends directly from switch 48 through conductor 178. Both windings 172 and 176 being energized, the temperature of body 174 starts to rise. The timing of this unit is, however, such that before contacts a thereof close, contacts a of relays 80, 82, and 86 open, unless one of the associated circuits 10 and 12 is in a critical condition, or the generator has failed. It may be assumed, as before, that the engine temperature is low, and that, consequently, contacts a of relay 84' remain open.

The current flowing through winding 176 also flows through the lamp 90, causing the latter to be dimly lighted and indicate its operative condition.

Assuming now that a critical condition exists in one or more of the signal relay circuits, one or more of contacts a of relays 80, 82, 84', and 86 close. Closure of any one of these contacts again energizes winding 172 which, with winding 176, raises the temperature of body 174 sufficiently to close contacts a. When this action occurs, a full-intensity circuit is completed for lamp 90, through conductor 178, the body 174, and contacts a of flasher 170. Closure of these contacts also short-circuits winding 176, thereby reducing the heating effect on body 174, and causing the contacts to reopen. So long as any one or more of the signal relay contacts a are closed accordingly, lamp 90 flashes and indicates the existence of the critical condition.

Suitable constructions of certain of the elements disclosed in Figures 1 and 2 hereof are disclosed in detail in the parent application Serial No. 138,249, and application therein referenced.

It is also contemplated that certain of the principles of the invention may be applied to gauging systems of the type disclosed in my Patent 2,625,595, granted January 13, 1953, although it is to be understood that it is not imperative in the application of the principles of the present invention to the system of that patent that the variable-impedance characteristic of the several signaling relays described and claimed therein be employed.

The gauging sub-circuits and the signaling relays individual thereto represented in Figure 3 of the drawings hereof are or may be identical to those disclosed in the aforesaid Patent 2,625,595, and consequently, their nature and operation will not be redescribed in detail, reference being had to the disclosure of that patent for a complete description of those elements and their co-operative relationship.

In general, the system of Figure 3 is adapted to be associated with and include a suitable source of energy, representatively, an automobile's voltage-supply system including a battery 202 and a generator 204, conductor 206 being connected to the armature terminal of the generator. In common practice, the generator is controlled by some form of voltage-regulator, current-regulator, cutout assembly such as that generally represented by the rectangle 208. Such units normally include means, in the form of a cutout or circuit breaker, for establishing or interrupting a connection between the battery and the generator in response to the output voltage of the generator. In common forms, series and shunt circuit-breaker windings are provided, with the series winding 210 being represented in rectangle 208. These windings control a contact 212.

The voltage appearing across battery 202 may be connected between conductor 216 and ground by closure of switch 218, which may be the automobile's ignition switch.

The voltage between conductor 216 and ground may be applied across each of a plurality of combined gauging and signaling circuits 220, 222 and 224. Thus, the voltage between conductor 216 and ground may be applied across the circuit comprising the polymetallic element 226 and winding 228 of the signaling relay 230, conductor 232, winding 234 of gauging device 236, winding 238 and polymetallic element 240 of the sender or current modulating device 242, and through the contacts 244 and 246 (when closed) of that device to ground. The position of contact 246, and hence, the amplitude of the average current in the traced circuit, is controlled by a float 248 positioned to sense the level of liquid in, for example, the gasoline tank of an automobile.

Contact 250 of signaling relay 230 is normally closed to contact 252 so that the voltage between conductor 216 and ground is normally applied through those contacts so as to appear between conductor 253 and ground.

If the level of the fuel is not less than a preselected quantity, the amplitude of the current in the gauging and signaling circuit 220 will be adequate to cause signaling relay 230 to separate contact 250 from contact 252. If the fuel level is initially low or if it subsequently becomes low, contact 250 will remain in engagement with or become reengaged with contact 252, respectively. It will be noted that a contact 254 is or may be provided on relay 230 to engage with a contact 256 to selectively shunt the winding 228 in accordance with the principles enunciated in the aforesaid Patent 2,625,595.

Similarly, gauging and signaling circuit 222 comprises a signaling relay 260, a gauging element 262 and a current modulating device 264 adapted to measure, for example, the oil pressure in the lubricating system of an automobile, with signaling relay 260 being adapted to interconnect conductors 216 and 253 if that oil pressure becomes critically low. Gauging and signaling circuit 224 comprises a signaling relay 266, a gauging element 268 and a current modulating device 270 adapted to respond to the temperature of the coolant fluid in the automobile engine and to connect conductor 216 to conductor 253 if the temperature of that fluid reaches a preselected critical level.

Thus, the combined gauging and signaling circuits are adapted to connect a source of voltage between conductor 253 and ground, both immediately the closure of an ignition switch, such as switch 218, and in response to the attainment of any one of a plurality of preselected critical conditions. In practice, fewer or more signaling relays may be provided.

The voltage between conductor 253 and ground, applied as above described, is developed across heater element 274 of integrating relay 276, which is shown to be of the thermal type. If the voltage is continuously applied to this heater winding for a sufficient period of time, or is intermittently applied for a sufficient percentage of a greater total period, the temperature of the polymetallic element of integrating relay 276 will be elevated adequately to close contacts 278 and 280 of that relay, connecting conductor 282 to ground via contacts 278 and 280 and the polymetallic portion of relay 276. Thus, in response to a true reduction of the volume of gasoline to or below a preselected volume, in response to a true reduction of the oil pressure below the preselected pressure or in response to a true elevation of the coolant fluid above a preselected temperature, all as opposed to transient attainments of those critical conditions, conductor 282 will be connected to ground.

Similarly, conductor 282 may be connected to ground through switch 284 which may be connected, in the manner known in the art, to sense any other selected condition. Thus, switch 284 may be mechanically coupled to the hand brake lever of the automobile so that switch 284 is closed whenever the hand brake is operated and opened whenever the hand brake is released. Conversely, switch 284 may be an oil pressure indicating switch to be employed in lieu of the signaling relay 260 or, under other circumstances, in lieu of the whole signaling and gauging circuit 222.

Whenever conductor 282 is connected to ground, through either relay 276 or switch 284, a series circuit is completed including battery 202, switch 218, electro-responsive device 286 (representatively a lamp), and return via conductor 282 and ground. The resultant application of the full voltage of battery 202 across lamp 286 will produce full illumination of that lamp to indicate the existence of a trouble condition. The lamp will remain energized until switch 284 is opened, until the trouble condition is relieved, resulting in the release of relay 276, or until switch 218 is opened. Flashing operation of the lamp 286 may be provided, if desired, in the manner known in the art.

Lamp 286 is also connected to sense a critical condition of generator 204, such as a continuing low output voltage across generator 204, a continuing high output voltage across generator 204, or to sense both critical conditions.

Assuming that switch 284 is open and that relay 276 is released, a series circuit is completed from generator 204, conductor 206, resistor 288, lamp 286, switch 218, battery 202, and back to the generator 204 via ground. Hence, there is applied across lamp 286 a voltage equal to the difference between the voltage across generator 204 and the voltage across battery 202, less the voltage drop across resistor 288. The value of resistor 288 and the characteristics of lamp 286 are selected so that the lamp 286 will not glow sufficiently brightly to attract the driver's attention unless the difference between the voltage across generator 204 and the voltage across battery 202 is greater than a preselected amount, the selection of that voltage difference being predicated upon a determination of what shall constitute an alarm condition. If the voltage across generator 204 is either greater or less than the voltage across battery 202 by a preselected amount, lamp 286 will glow brightly. If the difference is less, the lamp 286 will glow less brightly, with the intensity of illumination from lamp 286 reducing with reduction in voltage difference down to the point at which the glow of that lamp is not visible.

With a conventional regulator unit 208, contacts 212 of the circuit-breaker element of that regulator are normally closed so long as the voltage of generator 204 is greater than, equal to, or not much less than the voltage across battery 202. The resultant interconnection of the output terminals of battery 202 and generator 204 via winding 210 does not effectively modify the operation of the previously described series circuit.

Energization of lamp 286 as a result of the voltage of generator 204 being substantially greater than the voltage of battery 202 tends to be indicative of a faulty regulator unit 208. Lamp 286 will also be energized if the voltage of generator 204 is very low or zero, which may indicate only that the ignition switch 218 is closed and that the automobile's engine has not yet been started (valuable to prove the operability of lamp 286), or that the automobile's engine is idling too slowly to produce sufficient generator output voltage, or, if the automobile is moving at a sufficient rate, that the generator 204 is not properly functioning, that the generator drive belt is broken, or other system defects.

A function of resistor 288 is to serve as a load across which the voltage of generator 204 may be applied when relay 276 is operated or when switch 284 is closed in order to avoid short-circuiting the armature of that generator, this function being served whether circuit breaker contacts 212 are open or closed. Thus, the inclusion of resistor 288 permits lamp 286 to be employed as an alarm device to signal either the existence of a critical condition represented by the operation of relay 276 or switch 284 or a critical generator output voltage. If the value of resistor 288 were infinitely high, that is, if there were no connection between conductor 206 and conductor 282, lamp 286 could not sense the generator output voltage independently of the closure of contacts 278 and 280 or the closure of switch 284. Conversely, if the value of resistor 288 were very low, such as a direct connection between conductors 206 and 282, lamp 286 could be employed to sense the output voltage of generator 204 relative to the voltage of battery 202, but upon the closure of switch 284 or contacts 278 and 280, the generator 204 would be short-circuited, damaging relay 276, switch 284 or the generator. Thus, the provision of a single resistor 288 may permit the accomplishment of the sensing function normally previously accomplished by an additional signaling relay.

It will be perceived that in the arrangement of Figure 3, a single lamp 286 is or may be employed to indicate the existence of any of a plurality of trouble conditions including, in the exemplary representation, low gasoline level, low oil pressure, high coolant temperature, operation of the hand brake, and excessively low or excessively high generator output voltage.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In an electric gauging system for association with a source of electric energy having a variable voltage, electro-responsive gauging means progressively responsive to a variable current therethrough, electro-responsive signal means operable to produce an action in the event the rate at which electric energy is supplied thereto reaches a predetermined critical value, current modulating means responsive to a variable physical condition to be gauged and electrically coupled to said gauging means and to said signal means and effective concurrently to vary the current therethrough in response to changes in said physical condition, and voltage regulator means electrically coupled to all of said means so as to control the supply of energy from said source to said all of said means, said regulator means including means operable to cause said energy to be delivered to said all of said means as a succession of pulsations the effective voltage whereof is substantially independent of variations in voltage of said source.

2. In an electric gauging system for association with a source of electric energy having a variable voltage, thermally responsive gauging means integratingly and progressively responsive to a variable current therethrough, thermally responsive signal means integratingly responsive to current therethrough and operable to produce an action in the event the average rate at which electric energy is supplied thereto reaches a predetermined critical value, current modulating means responsive to a variable physical condition to be gauged and electrically coupled to said gauging means and to said signal means and effective concurrently to vary the current therethrough in response to changes in said physical condition, and voltage regulator means electrically coupled to all of said means so as to control the supply of energy from said source to said all of said means, said regulator means including means operable to cause said energy to be delivered to said all of said means as a succession of pulsations the effective voltage whereof is substantially independent of variations in voltage of said source.

3. In an electrical gauging system for association with a source of electric energy having a variable voltage, electro-responsive gauging means variably responsive to a variable current therethrough, electro-responsive signal means operable to produce an action in the event the rate at which electric energy is supplied thereto reaches a predetermined critical value, current modulating means responsive to a variable physical condition to be gauged, means connecting said gauging means and said signal means in series circuit relation whereby changes in said physical condition serve concurrently to vary the current through said gauging means and said signal means, and voltage regulator means serially connected to all of said means so as to control the supply of energy from said source to said all of said means, said regulator means including means operable to cause said energy to be so delivered as a succession of pulsations the effective voltage whereof is substantially independent of variations in the voltage of said source.

4. The structure of claim 3 wherein said gauging means and said signal means are thermally responsive and serve to integrate said pulsations.

5. In an electric gauging system for association with a source of electric energy having a variable voltage, a plurality of electro-responsive gauging means variably responsive to a variable current therethrough, a corresponding plurality of electro-responsive signal means each operable to produce an action in the event the rate at which electric energy is supplied thereto reaches a predetermined critical value, means electrically connecting each said gauging means and its corresponding said signal means in a corresponding circuit, current modulating means individual respectively to said gauging circuits and electrically coupled thereto and individually responsive to corresponding variable physical conditions and effective to vary the current through the corresponding circuits in response to changes in the individual physical conditions, voltage regulator means common to said circuits and electrically coupled thereto so as to control the supply of energy from said source to said gauging means and said signal means, said regulator means including means operable to cause said energy to be delivered to said gauging means and said signal means as a succession of pulsations the effective voltage whereof is substantially independent of variations in voltage of said source and of the currents drawn by said gauging means and said signal means, and signal mechanism common to said signal means and operably responsive to said actions thereof.

6. A combined gauge and signal system for motor vehicles, including an electric circuit having a modulated flow of eelctrical energy therein, electro-responsive gauge means connected in said circuit for indicating variation in the rate of energy flow therein, heat-responsive relay means for opening and closing a second electrical circuit, said relay means having an electrical heating element for operating the same connected in said first-named circuit, circuit means including an electrical signaling device, and time delay relay means operable in response to the condition of the second circuit for controlling the energization of said circuit means and thereby controlling the actuation of said signaling device.

7. In a gauging system, a plurality of gauging circuits, each including a gauging element responsive to current flow therethrough, current modulating means individual to each circuit and responsive to a corresponding variable physical condition for varying the flow of current through the corresponding circuit, and means rendering one of said gauging elements subject to control by another of said gauging elements.

8. A gauging system comprising, a pair of current-responsive gauging means, each said means being variously responsive to a variable current therethrough, a pair of current-responsive signal means, each said signal means being operable to produce an action in the event the rate at which electrical energy is supplied thereto reaches a predetermined value and embodying an energy consuming part, first gauging circuit means including a first of each of said pair of gauging means and signal means and a first current control means responsive to a first physical condition to be gauged for regulating the current through said first circuit, said current control means being effective to reduce the flow of current through said circuit as a consequence of said first condition reaching an undesired magnitude, second gauging circuit means including a second of each of said pair of gauging means and signal means and a second current control means responsive to a second physical condition to be gauged for regulating the current through said second circuit, said second current control means being effective to increase the flow of current through said second circuit as a consequence of said second condition reaching an undesired magnitude, said second signal means being provided with a second energy consuming part acting upon increased current flow to produce said action in said second signal means, alarm circuit means actuatable as a consequence of the production of said action by said second element, and control circuit means including said second energy consuming part of said second signal means and energized as a consequence of the production of said action by said first signal means.

9. The combination of claim 8 in which each of said signal means comprises a temperature responsive member and each of said parts comprises a resistance arranged in heat exchange relation with the one of said temperature responsive members of the one of said signal elements with which it is associated, said alarm circuit means is actuated as a consequence of an increase in temperature of said temperature responsive member of said second signal means, and said control circuit means is energized as a consequence of an increase in temperature of said temperature responsive member of said first signal means.

10. In an electric gauging system for association with a source of electric energy, a plurality of electro-responsive signal means each operable to produce an action in the event that the rate at which electric energy is supplied thereto reaches a predetermined critical value, current modulating means individual respectively to said signal means and electrically coupled thereto and individually responsive to corresponding variable physical conditions and effective to vary the current through the corresponding signal means in response to changes in the individual physical conditions, load means common to said signal means and operably responsive to said actions thereof, and means rendering one of said signal means subject to control by another of said signal means.

11. In a signaling system including a voltage source and adapted to signal the existence of either of two effectively independent critical conditions in and during the operation of an associated system, an electro-responsive device operable when energized by said voltage source, first electro-responsive means energizable by said voltage source and operative in response to a first of the critical conditions for establishing an energizing circuit including said voltage source for operating said device, and second electro-responsive means responsive to the second of the critical conditions for establishing an energizing circuit including said voltage source for said first electro-responsive means so as to operate said device.

12. In a signaling system adapted to signal the existence of either of two effectively independent critical conditions in and during the operation of an associated system, an electro-responsive device, first electro-responsive means operative in response to a first of the critical conditions for operating said device, second electro-responsive means operative each time the second of the critical conditions exists, and means including said first electro-responsive means for operating said device only after said second electro-responsive means has been operated a preselected time interval.

13. In a signaling system adapted to signal the existence of either of two effectively independent critical conditions in and during the operation of an associated system, an electro-responsive device, thermally responsive means including a polymetallic element for controlling said device, first and second heater means for controlling said polymetallic element, means responsive to the first of the critical conditions for controlling the energization of said first heater means, another polymetallic thermally responsive element responsive to the second of the critical conditions, and means including said other polymetallic thermally responsive element for controlling the energization of said second heater means.

14. Signaling apparatus for association with an electric circuit having a modulated flow of electrical energy therein comprising sensing means for sensing the average energy in said circuit over finite periods of time, an electro-responsive device, and separate delay means controlled by said sensing means for operating said device.

15. Signaling apparatus for association with an electric circuit having a modulated flow of electrical energy therein comprising a source of energy, a control circuit, sensing means effective whenever the average energy in said electric circuit over finite periods of time exceeds a preselected value for connecting said source of energy to said control circuit, an electro-responsive device, and means effective whenever the average energy in said control circuit over finite periods of time exceeds a preselected value for operating said device.

16. Signaling apparatus for association with a plurality of electric circuits each having a modulated flow of energy therein, sensing means individual to each of said circuits for sensing the average energy in each of said circuits over finite periods of time, an electro-responsive device, and delay means controlled by said sensing means for operating said device.

17. Signaling apparatus for association with an electric circuit having a modulated flow of electrical energy therein, an electro-responsive device, delay means for operating said device, and thermally responsive relay means responsive to the level of the energy in said electric circuit for energizing said delay means.

18. Signaling apparatus for association with an electric circuit having a modulated flow of electrical energy therein, an electro-responsive device, thermally responsive relay means for operating said device, and relay means responsive to the energy in said electrical circuit for energizing said thermally responsive relay means.

19. Signaling apparatus for association with an electric circuit having a modulated flow of electrical energy therein, an electro-responsive device, first thermally responsive relay means for controlling said device, and second thermally responsive relay means including a heater winding in said electric circuit for controlling said first thermally responsive relay means.

20. Signaling apparatus for association with a plurality of electric circuits each having a modulated flow of energy therein, an electro-responsive device, first thermally responsive relay means for controlling said device, and a plurality of thermally responsive relay means each including a heater winding in an individual one of said electric circuits for controlling said first thermally responsive relay means.

21. In a signaling system including an electric circuit having a modulated flow of electrical energy therein, an electro-responsive gauge connected in said electric circuit for indicating variations in the rate of flow of said energy, sensing means for sensing the average energy in said circuit over finite periods of time, an electro-responsive device, and separate delay means controlled by said sensing means for operating said device.

22. In a signaling system including a plurality of electric circuits each having a modulated flow of energy therein, an electro-responsive gauge connected in each of said electrical circuits for indicating variations in the rate of flow of said energy in the individual ones of said circuits, sensing means individual to each of said circuits for sensing the average energy in said each of said circuits over finite periods of time, an electro-responsive device, and delay means controlled by all of said sensing means for operating said device.

23. Signaling apparatus for association with an electric circuit having a modulated flow of electrical energy therein comprising sensing means for sensing the average energy in said circuit over finite periods of time, an electro-responsive device, and separate delay means controlled by said sensing means for intermittently operating said device.

24. Signaling apparatus for association with an electric circuit having a modulated flow of electrical energy therein comprising sensing means for sensing the average energy in said circuit over finite periods of time, an electro-responsive device, separate delay means controlled by said sensing means for operating said device, and means including said delay means for periodically interrupting the operation of said device.

25. In a signaling system for association with a voltage source and including a condition-responsive switch and an electric circuit having a modulated flow of electrical energy therein, sensing means for sensing the average energy in said circuit over finite periods of time, an electro-responsive device, separate delay means controlled by said sensing means for controlling the energization of said device by said voltage source, and means including said condition-responsive switch for controlling the energization of said device by said voltage source.

26. In a signaling system for association with a voltage source and including a condition-responsive switch and an electric circuit having a modulated flow of electrical energy therein, an electro-responsive device, first thermally responsive relay means for controlling the energization of said device by said voltage source, second thermally responsive relay means including a heater winding in said electric circuit for controlling said first thermally responsive relay means, and means including said condition-responsive switch for controlling the energization of said device by said voltage source.

27. In a signaling system for an automobile having a generator and a battery, a signal lamp, a resistor, means for connecting said signal lamp and said resistor in series with each other and with said generator and said battery, and switching means for connecting said signal lamp across said battery and for connecting said resistor across said generator.

28. In a signaling system for an automobile having two voltage sources, a voltage-responsive alarm device, circuit means for applying across said device a voltage which varies as a function of the difference between the voltages of said sources, circuit means for applying across said device a voltage which varies as a function of the voltage across one of said sources only, and means for alternatively enabling said circuit means comprising a thermal-responsive relay for selectively connecting one terminal of said lamp directly to one terminal of at least one of said voltage sources.

29. In a signaling system for an automobile having two voltage sources, a voltage-responsive alarm device, circuit means for applying across said device a voltage which varies in accordance with the difference between the voltages of said sources, circuit means for applying across said device a voltage which varies as a function of the voltage across one of said sources only, and means responsive to a selected critical condition of the automobile for alternatively enabling said circuit means comprising a thermal-responsive relay having contacts serving as elements of at least one of said circuit means.

30. In a signaling system for an automobile having a battery and a generator, a voltage-responsive alarm device, circuit means for applying across said device a voltage which varies as a function of the difference between the voltages of said generator and of said battery, circuit means for applying across said device a voltage which varies as a function of the voltage across said battery, and means responsive to a selected critical condition of the automobile for alternatively enabling said circuit means comprising a thermal-responsive relay having contacts serving as elements of at least one of said circuit means.

31. In combination, a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, and temperature sensing means disposable in heat transfer relationship with a body the temperature of which is to be sensed for controlling said second heating means.

32. In combination, a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, and temperature sensing means disposable in heat transfer relationship with a body the temperature of which is to be sensed for controlling said second heating means, said sensing means comprising a resistor having a high temperature coefficient of resistance and connected in circuit with said second heating means.

33. In a system for association with a source of electrical energy having a variable voltage, the combination of a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, temperature sensing means disposable in heat transfer relationship with a body the temperature of which is to be sensed for controlling said second heating means, said sensing means comprising a resistor having a high temperature coefficient of resistance and connected in circuit with said second heating means, and thermal-electric voltage regulating means for supplying to the circuit including said sensing means and said second heating means energy from the source as a succession of pulsations the effective voltage whereof is substantially independent of variations in voltage of the source.

34. In combination, a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, and temperature sensing means disposable in heat transfer relationship with a body the temperature of which is to be sensed for controlling said second heating means, said control apparatus maintaining said load device in said first condition at sensed temperatures below a preselected value.

35. In combination, a load device having a first and a second condition, and control apparatus for controlling the condition of said load device comprising means including a first polymetallic element for controlling said load device, first heating means for said polymetallic element, electrical contact means for controlling said first heating means, said electrical contact means having two relationships, in a first of which said first heating means is energized and in a second of which said first heating means is de-energized, a second polymetallic element for controlling the relationship of said electrical contact means, said contact means being moved from one to the other of said relationships upon movement of said second polymetallic element to a preselected position, second heating means for said second polymetallic element, said second polymetallic element being moved to said preselected position in response to a selected heat output of said second heating means, and temperature sensing means disposable in heat transfer relationship with a body the temperature of which is to be sensed for controlling said second heating means, said second heating means reaching said selected heat output when said sensing means reaches a preselected temperature.

36. In combination, a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, and temperature sensing means disposable in heat transfer relationship with a body the temperature of which is to be sensed for controlling said second heating means, said control apparatus maintaining said load device in said first condition at sensed temperatures below a preselected value and intermittently changing the condition of said load device between said first and said second conditions above said preselected temperature.

37. In combination, a load device having a first and a second condition, and control apparatus for controlling the condition of said load device comprising means including a first polymetallic element for controlling said load device, first heating means for said polymetallic element, electrical contact means for controlling said first heating means, said electrical contact means having two relationships, in a first of which said first heating means is energized and in a second of which said first heating means is de-energized, a second polymetallic element for controlling the relationship of said electrical contact means, said contact means being moved from one to the other of said relationships upon movement of said polymetallic element to a preselected position, second heating means for said second polymetallic element, said second polymetallic element being moved to said preselected position in response to a selected heat output of said second heating means, and temperature sensing means disposable in heat transfer relationship with a body the temperature of which is to be sensed for controlling said second heating means, said second heating means reaching said selected heat output when said sensing means reaches a preselected temperature, and means effective after said contact means has been moved from said one to said other of said relationships for intermittently changing the condition of said load device between said first and said second conditions.

38. In combination, a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, a scale, movable pointer means cooperating with said scale for indicating the temperature of the body, means including second heating means for said second polymetallic element for varying the positions of said second polymetallic element and of said pointer means in accordance with the temperature of a body the temperature of which is to be sensed and indicated, and temperature sensing means disposable for the body for controlling said means including second heating means.

39. In a system for association with a source of electrical energy having a variable voltage, the combination of a load device having a first and a second condition, and control apparatus for controlling the condition of said load device comprising means including a first polymetallic element for controlling said load device, first heating means for said polymetallic element, electrical contact means for controlling said first heating means, means including a second polymetallic element for controlling said contact means, second heating means for said second polymetallic element, temperature sensing means disposable in heat transfer relationship with a body the temperature of which is to be sensed for controlling said second heating means, said sensing means comprising a resistor having a high temperature coefficient of resistance and connected in circuit with said second heating means, said control apparatus maintaining said load device in said first condition at sensed temperatures below a preselected value and intermittently changing the condition of said load device between said first and said second conditions above said preselected temperature, and thermal-electric voltage regulating means for supplying to the circuit including said sensing means and said second heating means energy from the source as a succession of pulsations the effective voltage whereof is substantially independent of variations in voltage of the source.

References Cited in the file of this patent

UNITED STATES PATENTS

| | | |
|---|---|---|
| 1,521,584 | Davies | Dec. 30, 1924 |
| 2,064,460 | Carr et al. | Dec. 15, 1936 |
| 2,762,997 | Boddy | Sept. 11, 1956 |